BEST AVAILABLE COPY

E. F. Anderson.

Toy.

No. 3891.

Reissued Mar. 22. 1870.

Witnesses.

J. H. Shumway

A. J. Tibbits

Inventor.

Mrs E. F. Anderson

By her Attorney

John E. Earle

United States Patent Office.

E. F. ANDERSON, OF MANSFIELD, CONNECTICUT.

*Letters Patent No.* 92,244, *dated July* 6, 1869; *reissue No.* 3,891, *March* 22, 1870.

TEACHERS' TOY.

The Schedule referred to in these Letters Patent and making part of the same.

*To all whom it may concern:*

Be it known that I, E. F. ANDERSON, of Mansfield, in the county of Tolland and State of Connecticut, have invented a new and improved Toy; and I do hereby declare the following, when taken in connection with the accompanying drawings and the letters of reference marked thereon, to be a full, clear, and exact description of the same, and which said drawings constitute part of this specification, and represent in—

Figure 1:
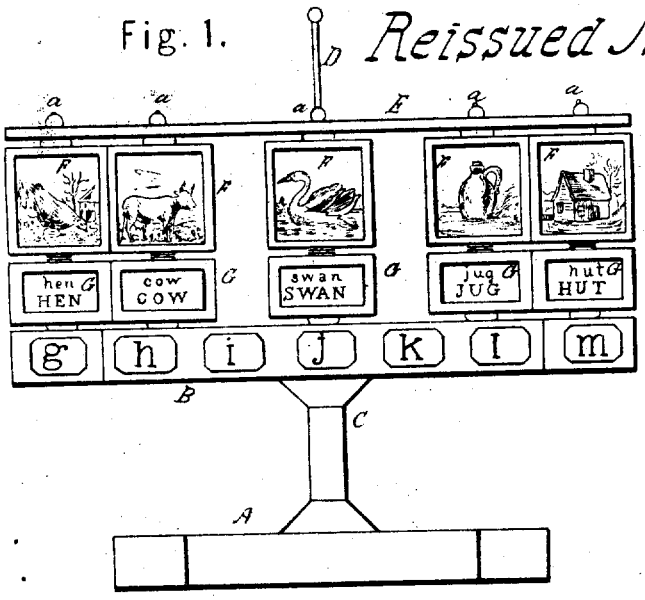

Figure 1 a side view, and in

Figure 2 a top view.

This invention relates to an improvement in toys, which serve both as an amusement and an instructor or object-teacher, and The invention consists—

First, in the arrangement upon a revolving table of several revolving blocks having figures upon their various sides, the blocks revolving independently of each other and the table.

A is the base.

B the table, supported upon a standard, C, and with a vertical shaft, D, centrally arranged through the table, and around which the table will freely revolve.

Above the table, at a suitable distance, I arrange a top plate, E, corresponding in form to the table below, and through the plate E I pass spindles *a*, more or less in number, extending down into, and so as to be supported in the table below.

Between the table and plate I arrange blocks F, more or less in number, upon the different sides of which illustrations varying from each other are placed, the said blocks being arranged upon and supported by the said spindles, and so as to turn freely, to present either side of the block out.

The revolving of the table and change of blocks afford amusement for the child, and, as an object-teacher, instructs the child as to the name of the illustrations upon the various sides of the block, by turning the block so as to present the required illustration upon the block to the front.

As an instructor, I prefer to add other blocks, G, upon the said spindle, with corresponding sides, and upon the several sides place the name of the illustration, as seen in fig. 1.

The blocks G turn independent of the blocks F, so that the child is required to arrange the blocks G with the names on the said blocks corresponding to the illustrations on the blocks F.

Figure 2:
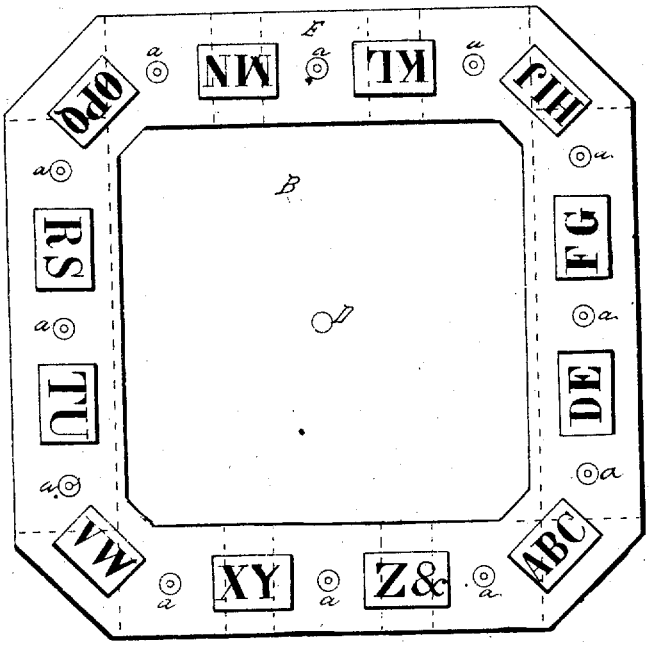

In addition to this, letters may be placed on the table or plate, as seen in figs. 1 and 2.

I do not wish to be understood as broadly claiming the arrangement of several blocks so as to revolve upon an axis common to all, as such I am aware is not new.

I claim as my invention—

1. The arrangement, upon a revolving plate or table, B, of several blocks upon spindles, so as to turn each block independent of the other and of the table, substantially as described.

2. The arrangement, upon a revolving table or plate, B, of two or more series of blocks, F and G, each series revolving independent of the other series, and each block independent of the other block of the same series, substantially as described.

E. F. ANDERSON.

Witnesses:

JOHN N. BARROWS,

M. B. WHITNEY.